No. 610,661. Patented Sept. 13, 1898.
J. OZENBERGER.
GATE.
Application filed Mar. 19. 1898.
(No Model.) 2 Sheets—Sheet 1.
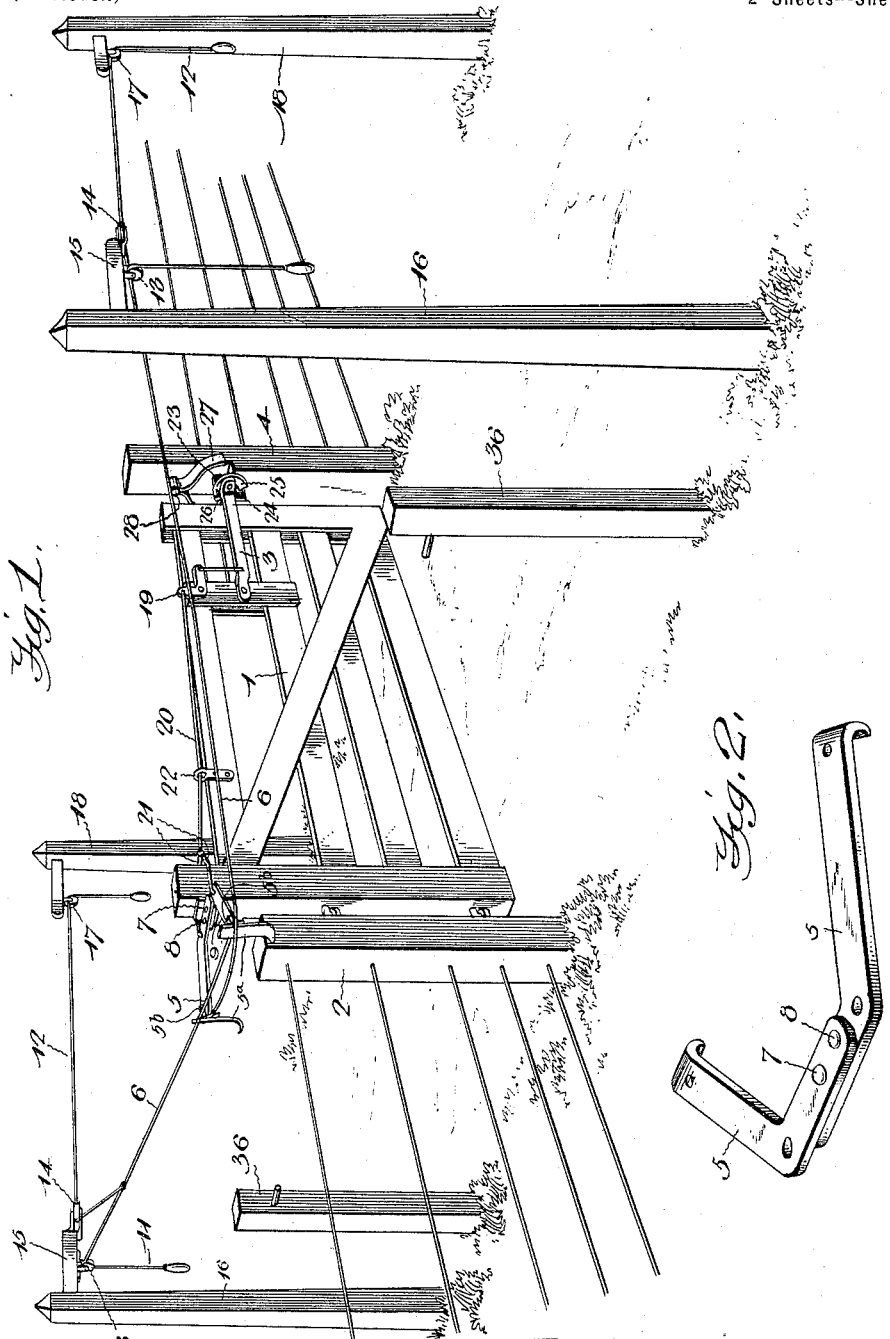
Witnesses
Joseph Ozenberger, Inventor.
By his Attorneys.

No. 610,661. Patented Sept. 13, 1898.
J. OZENBERGER.
GATE.
(Application filed Mar. 19, 1898.)
(No Model.) 2 Sheets—Sheet 2.
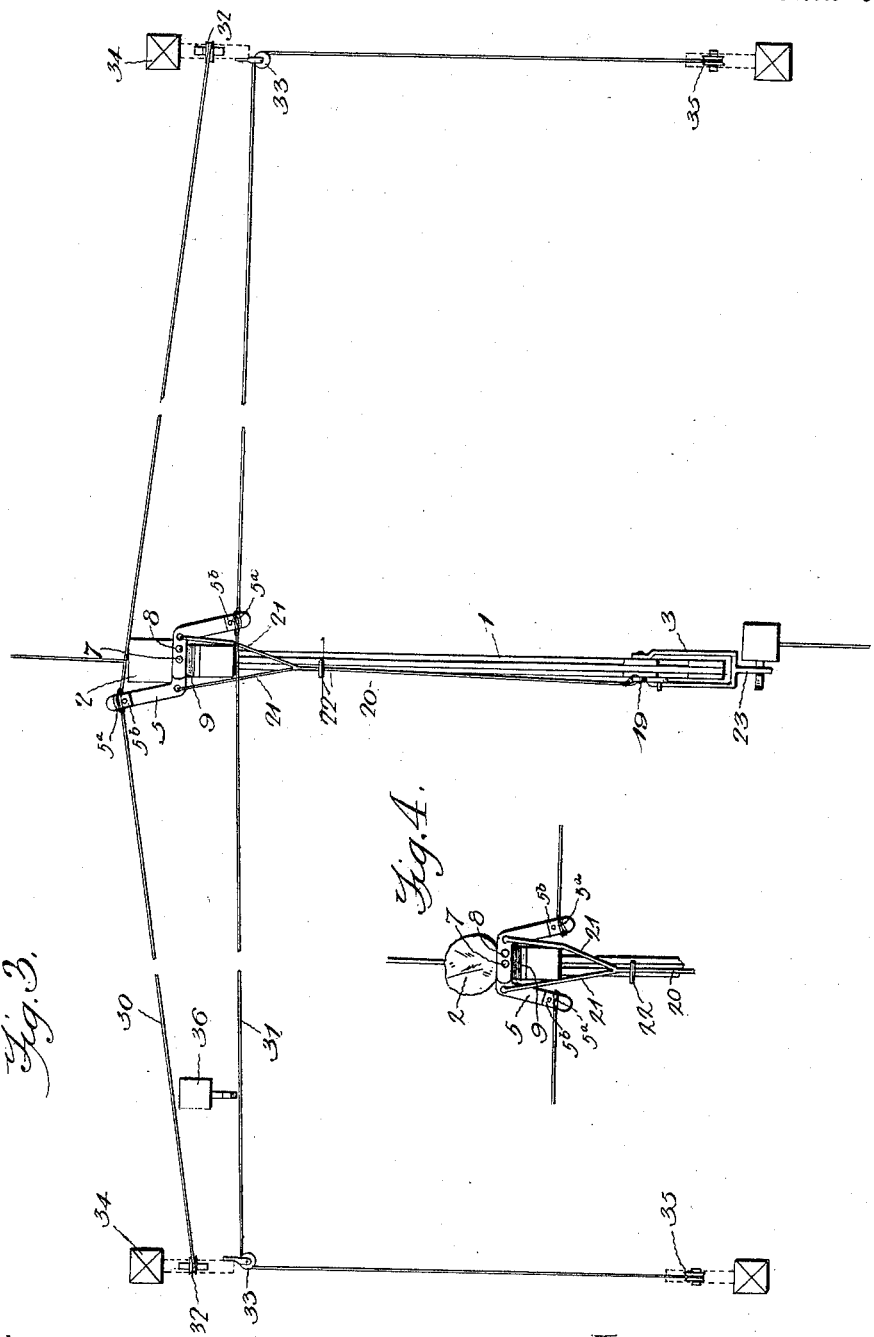
Witnesses Joseph Ozenberger, Inventor.
By his Attorneys,

UNITED STATES PATENT OFFICE.

JOSEPH OZENBERGER, OF MIDDLETOWN, CALIFORNIA.

GATE.

SPECIFICATION forming part of Letters Patent No. 610,661, dated September 13, 1898.

Application filed March 19, 1898. Serial No. 674,495. (No model.)

*To all whom it may concern:*

Be it known that I, JOSEPH OZENBERGER, a citizen of the United States, residing at Middletown, in the county of Lake and State of California, have invented a new and useful Gate, of which the following is a specification.

The invention relates to improvements in gates.

The object of the present invention is to improve the construction of swinging gates, more especially the operating mechanism for the same, and to provide simple, inexpensive, and efficient operating mechanism capable of enabling a gate to be opened and closed at a distance from it without dismounting from a horse or leaving a vehicle.

Another object of the invention is to provide an operating mechanism adapted to be applied to gates operating in one or both directions and capable of enabling a gate to be hung on a tree without interfering with it.

The invention consists in the construction and novel combination and arrangement of parts, as hereinafter fully described, illustrated in the accompanying drawings, and pointed out in the claims hereto appended.

In the drawings, Figure 1 is a perspective view of a gate constructed in accordance with this invention. Fig. 2 is a detail perspective view of the horizontally-swinging lever which is connected with the latch and to which the operating-ropes are attached. Fig. 3 is a plan view showing the operating mechanism arranged for swinging the gate in one direction only in opening. Fig. 4 is a detail view illustrating the arrangement of the operating-ropes when both the arms of the U-shaped lever extend forward.

Like numerals of reference designate corresponding parts in all the figures of the drawings.

1 designates a swinging gate hinged to a post 2 and provided with a pivoted latch 3, adapted to engage a latch-post 4 to lock the gate in its closed position and connected with a horizontally-swinging lever 5, to which operating-ropes 6 are attached, whereby when the operating-ropes are pulled the latch will be disengaged and the gate will be swung on its hinges.

The horizontally-swinging lever is composed of two separable sections detachably secured together at the center by means of a pivot-pin 7 and a fastening device 8 and adapted to be arranged to provide a pair of similar rearwardly-projecting arms, as illustrated in Fig. 1 of the drawings, and also to be disposed, as illustrated in Fig. 3, so that one arm will extend forward and the other rearward from the rear end bar of the gate. When the lever is substantially U-shaped, as shown in Fig. 1, it is adapted to operate a gate opening in either direction. The gate may also be hung to a tree and arranged close to the same, and the lever 5 will then extend forward and have its arms arranged at opposite sides of the rear end bar of the gate. When the lever is arranged in this manner, the gate opens toward the operator. When the lever is arranged as illustrated in Fig. 3, it is adapted to operate a gate opening in one direction only, as will be hereinafter more fully described.

The pivot 7 extends through a suitable bracket 9, mounted on the rear end bar of the gate and forming a support for the lever, and the arms of the latter are attached to the operating-ropes 6. The operating-ropes, which are crossed at the back of the gate, as clearly shown in Fig. 1 of the drawings, extend from the gate in opposite directions. The arms of the lever 5 carry guides $5^a$, disposed substantially vertical and having their lower portions slightly curved rearward. The guides which are adapted to support the ropes have the inner ends of the same attached to them and are provided with arms $5^b$, which are arranged on the upper faces of the arms of the lever 5 and secured to the same. By arranging the inner portions of the operating-ropes in this manner the gate is opened away from the operator and is adapted to be completely opened. Each rope is provided with outer branches 11 and 12, extending over guide-pulleys 13 and 14 of an arm 15 of an upright 16. The branch 11 of the operating-rope depends from the guide-pulley 13 and is provided at its end with a suitable grip or handle, which is located at one side of the roadway. The other branch 12, which passes around the guide-pulley 14, extends across the roadway to a guide-pulley 17 of an arm of an upright 18. The handles are located at opposite sides of the roadway, and a draft on either one when the gate is closed will open the same, swinging it away from the operator, so that it cannot strike or frighten a team, and after passing through the gateway either of the other handles may be grasped to close the gate.

The sections of the horizontally-swinging lever are composed of two arms arranged at an angle to each other, the angle being slightly greater than a right angle, and when the lever is U-shaped it is connected at the angles of its sections with a bell-crank lever 19, the connection 20 being provided with flexible branches 21, extending around opposite sides of the rear end bar of the gate. The front portion of the connection 20 consists, preferably, of a wire passing through a guide 22 and secured to the vertical arm of the bell-crank lever, the other arm thereof being normally horizontal. The horizontal arm of the bell-crank lever is connected by a rod with the latch 3 and is adapted to lift the same out of engagement with a projection or keeper 24 of the latch-post 4.

In Fig. 3 of the accompanying drawings two operating-ropes 30 and 31 extend from each side of the gate and pass over guide-pulleys 32 and 33 of an upright or other support 34, and the operating-rope 31 extends from the guide-pulley 33 to a guide-pulley 35 at the opposite side of the roadway. One of the operating-ropes of each pair opens the gate, and the other operating-rope is adapted for closing the gate. The lever in extending forward and rearward from the rear end bar of the gate is pivotally mounted thereon and operates the latch, as before described.

Supplemental latch-posts are provided, as clearly shown at 36 in Fig. 1 of the accompanying drawings, and these latch-posts are provided with suitable projections or keepers arranged to be engaged by the latch, whereby the gate is positively locked when open to prevent it from closing accidentally.

The invention has the following advantages: The gate is simple and comparatively inexpensive in construction, and while it is adapted to be opened and closed at a distance from it the operating mechanism may be applied to gates opening in one or both directions.

Changes in the form, proportion, and minor details of construction may be resorted to without departing from the spirit or sacrificing any of the advantages of this invention.

What I claim is—

1. In a device of the class described, the combination with a swinging gate, of a latch mounted thereon, a horizontally-swinging lever fulcrumed on the gate and connected with the latch, said lever being composed of two sections forming arms and capable of adjustment to extend the arms in rear of the gate or in advance and in rear of the same, said sections being substantially L-shaped and adapted to clear the end bar of the gate and operating mechanism connected with the arms of the lever, subtantially as described.

2. In a device of the class described, the combination with a swinging gate, of a latch mounted thereon, a substantially U-shaped reversible lever fulcrumed on the gate and having its arms extending rearward therefrom, said lever being adapted to have its arms arranged at each side of the gate and being composed of two sections, whereby it may be adjusted to extend one arm forward and the other rearward, connections between the lever and the latch, and operating mechanism connected with the arms of the lever, substantially as described.

3. In a device of the class described, the combination of a gate, a latch mounted thereon, a lever fulcrumed on the gate and composed of two reversible L-shaped sections, connections between the latch and the lever, said connections being provided with flexible branches 21 located at opposite sides of the rear end bar of the gate and attached to the sections of the lever at the angles thereof, and operating mechanism connected with the ends of the sections of the lever, substantially as described.

4. In a device of the class described, the combination of a swinging gate provided with a latch, a lever pivotally mounted on the gate at the back thereof and connected with the latch, the operating-ropes connected to the arms of the lever and extending from the gate in opposite directions, said operating-ropes being provided at their outer portions with branches 11 and 12, the branches 12 being extended across the roadway, and means for supporting the branches of the operating-ropes, substantially as described.

5. In a device of the class described, the combination with a gate, of a latch mounted thereon, a substantially U-shaped lever fulcrumed on the gate and having its arms extending rearward therefrom, connections between the latch and the lever, guides depending from the arms of the lever and having their lower portions extended outward, and the crossed operating-ropes arranged on the guides and connected with the same, substantially as described.

In testimony that I claim the foregoing as my own I have hereto affixed my signature in the presence of two witnesses.

JOSEPH OZENBERGER.

Witnesses:
 W. G. CANNON,
 GEO. W. KEMP.